(12) United States Patent
McIntosh

(10) Patent No.: US 9,688,407 B2
(45) Date of Patent: Jun. 27, 2017

(54) MODULAR LAVATORY SYSTEM

(71) Applicant: The Boeing Company, Chicago, IL (US)

(72) Inventor: Darren Carl McIntosh, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 580 days.

(21) Appl. No.: 14/045,493

(22) Filed: Oct. 3, 2013

(65) Prior Publication Data
US 2015/0096118 A1    Apr. 9, 2015

(51) Int. Cl.
*A47K 17/00*    (2006.01)
*B64D 11/02*    (2006.01)

(52) U.S. Cl.
CPC ......... *B64D 11/02* (2013.01); *Y10T 29/49826* (2015.01)

(58) Field of Classification Search
CPC ...................................................... B64D 11/02
USPC ........................................................... 4/664
See application file for complete search history.

(56) References Cited

U.S. PATENT DOCUMENTS

| | | | |
|---|---|---|---|
| 3,541,750 A | 11/1970 | Ritter | |
| 3,862,525 A | 1/1975 | Greenspan | |
| 4,100,857 A | 7/1978 | Gutridge et al. | |
| 4,589,463 A | 5/1986 | Ryan | |
| 4,672,772 A | 6/1987 | Nakamura | |
| 5,573,053 A | 11/1996 | Hanemaayer | |
| 6,007,025 A | 12/1999 | Coughren et al. | |
| 6,079,669 A | 6/2000 | Hanay et al. | |
| 6,186,444 B1 | 2/2001 | Steel | |
| 6,257,523 B1 | 7/2001 | Olliges | |
| 6,604,709 B1 | 8/2003 | Wentland et al. | |
| 6,615,421 B2 | 9/2003 | Itakura | |
| 6,889,936 B1 | 5/2005 | Pho et al. | |
| 7,152,257 B2 | 12/2006 | Stratmann et al. | |
| 7,165,595 B2 | 1/2007 | Yamamoto | |
| 7,222,820 B2* | 5/2007 | Wentland | B64D 11/02 244/118.5 |
| 7,284,287 B2* | 10/2007 | Cooper | B64D 11/02 4/664 |
| 7,364,119 B2 | 4/2008 | Sprenger et al. | |
| 7,721,990 B2 | 5/2010 | Jaeger et al. | |
| 7,823,834 B2 | 11/2010 | French et al. | |
| 7,866,603 B2 | 1/2011 | Cooper et al. | |

(Continued)

FOREIGN PATENT DOCUMENTS

CN    102762455 A    10/2012
DE    102011011704 A1    12/2012
(Continued)

OTHER PUBLICATIONS

International Search Report and Written Opinion dated Sep. 19, 2014, regarding Application No. PCT/US2014/043682, 11 pages.
(Continued)

*Primary Examiner* — Huyen Le
(74) *Attorney, Agent, or Firm* — Yee & Associates, P.C.

(57) ABSTRACT

A method and apparatus are presented. An apparatus comprises a wall and a urinal. The wall is physically associated with a fuselage for an aircraft. The urinal is positioned along the wall, the wall and urinal positioned within a specialty lavatory area module.

21 Claims, 13 Drawing Sheets

(56) References Cited

U.S. PATENT DOCUMENTS

| | | | |
|---|---|---|---|
| 7,950,439 B2 | 5/2011 | Anderson | |
| 7,984,875 B2 | 7/2011 | Koehn et al. | |
| 8,517,307 B2 | 8/2013 | Saint-Jalmes et al. | |
| 8,621,787 B2 | 1/2014 | Barry et al. | |
| 8,662,444 B2 * | 3/2014 | Tappe | B64D 11/02 244/117 R |
| 8,672,267 B2 | 3/2014 | Schliwa et al. | |
| 8,720,827 B2 | 5/2014 | Boren et al. | |
| 8,944,377 B2 | 2/2015 | McIntosh | |
| 9,045,231 B2 * | 6/2015 | Swain | B64D 11/0023 |
| 2003/0066931 A1 | 4/2003 | Ward | |
| 2004/0163170 A1 | 8/2004 | Cooper et al. | |
| 2004/0173327 A1 | 9/2004 | Steel et al. | |
| 2004/0227034 A1 | 11/2004 | Wentland et al. | |
| 2005/0116098 A1 | 6/2005 | Martens et al. | |
| 2005/0116099 A1 | 6/2005 | Pho et al. | |
| 2005/0125891 A1 * | 6/2005 | Stratmann | E04H 1/1216 4/661 |
| 2005/0241062 A1 | 11/2005 | Quan | |
| 2006/0169839 A1 | 8/2006 | French et al. | |
| 2007/0119548 A1 | 5/2007 | Anderson | |
| 2009/0065641 A1 | 3/2009 | Koehn et al. | |
| 2010/0237193 A1 | 9/2010 | Yoshizaki | |
| 2012/0261509 A1 | 10/2012 | Grant et al. | |
| 2013/0001359 A1 * | 1/2013 | Schliwa | B64D 11/02 244/118.6 |
| 2013/0206907 A1 | 8/2013 | Burrows et al. | |
| 2014/0077033 A1 * | 3/2014 | Scown | B64D 11/02 244/118.5 |
| 2014/0083012 A1 | 3/2014 | Boren et al. | |
| 2014/0123571 A1 | 5/2014 | Swain | |
| 2014/0360099 A1 | 12/2014 | McIntosh | |
| 2015/0259070 A1 * | 9/2015 | Seibt | B64D 11/02 244/118.5 |

FOREIGN PATENT DOCUMENTS

| | | |
|---|---|---|
| EP | 2914492 A1 | 9/2015 |
| EP | 2974960 A1 | 1/2016 |
| WO | WO03064790 A1 | 8/2003 |
| WO | WO2004076279 A2 | 9/2004 |
| WO | WO2011101385 A2 | 8/2011 |

OTHER PUBLICATIONS

Final Office Action, dated Aug. 7, 2014, regarding U.S. Appl. No. 13/621,462, 14 pages.
Notice of Allowance, dated Sep. 3, 2014, regarding U.S. Appl. No. 13/915,031, 13 pages.
Extended European Search Report, dated Nov. 21, 2014, regarding Application No. EP14162310.8, 7 pages.
Notice of Allowance, dated Mar. 3, 2014, regarding U.S. Appl. No. 13/625,872, 10 pages.
Office Action, dated Apr. 25, 2014, regarding U.S. Appl. No. 13/621,462, 20 pages.
Office Action, dated Apr. 23, 2014, regarding U.S. Appl. No. 13/915,031, 20 pages.
Scown et al., "Lavatory Reconfiguration System," U.S. Appl. No. 13/621,462, filed Sep. 17, 2012, 46 pages.
Boren, "Dual Function Lavatory Door," U.S. Appl. No. 13/625,872, filed Sep. 25, 2012, 38 pages.
McIntosh, "Lavatory Reconfiguration System," U.S. Appl. No. 13/915,031, filed Jun. 11, 2013, 57 pages.
"Lavatory Accessibility in Single-Aisle Aircraft: Final Report of the Aircraft Accessibility Federal Advisory Committee," Office of Environment, Energy, and Safety, U.S. Department of Transportation, Apr. 1993, 61 PAGES, accessed Aug. 30,2012ntl.bts.gov/lib/22000/22900/22931/lavacces.pdf.
"Space-Flex: Innovative cabin option for A320—Cabin configuration adds space for more seats," Noticias Airbus, No. 142, Apr./May 2012, 1 PAGE, accessed Aug. 30, 2012http://www.noticiaslatamsales.com/en/editions/detail/AprMay2012/innovations/129/Space-Flex-Innovative-cabin-option-for-A320.
Notice of Allowance, dated Nov. 30, 2015, regarding U.S. Appl. No. 13/621,462, 13 pages.
Chinese Notification of First Office Action and English translation, dated Feb. 23, 2017, regarding Application No. 2014800485161, 25 pages.
European Examination Report, dated Mar. 28, 2017, regarding Application No. 14741726.5, 7 pages.

\* cited by examiner

MODULAR LAVATORY SYSTEM

BACKGROUND INFORMATION

1. Field

The present disclosure relates generally to aircraft and, in particular, to lavatories in aircraft. More particularly, the present disclosure relates to the design and assembly of lavatories in aircraft.

2. Background

In designing and manufacturing aircraft, maximizing the amount of space available for passenger seating is an important consideration. In addition to passenger seating, galleys, closets, lavatories, and other areas may take up space in the interior of the aircraft.

With respect to lavatories in an aircraft, the position and design of lavatories may not be consistent within aircraft of the same model. In some situations, the design and position of lavatories may be selected by a purchaser. Further, a purchaser may position and design galleys. Purchasers may position and design lavatories and galleys based on purchaser desires.

Handicap access is an important consideration in the design of lavatories. Handicap access includes access for passengers in wheelchairs. Standards for handicap access in an aircraft are often specified through regulations and laws.

In some cases, the lavatories designed for accommodating handicapped passengers require more space than standard lavatories in an aircraft. A lavatory may be redesigned to provide the desired amount of space for access by handicapped passengers.

The redesign may be performed for an aircraft being manufactured or the redesign may be used to refurbish existing aircraft to provide the desired access for handicapped passengers. This redesign may take various forms. For example, the lavatory may be redesigned such that a desired amount of space is present with a desired configuration within the lavatory.

In some cases, the lavatories may be redesigned to extend into space normally used for aisles or other purposes when access by a handicapped passenger is needed. In yet other examples, a more efficient use of space may involve two lavatories being positioned next to each other and reconfigured to provide more access than a single lavatory for a handicapped passenger when needed.

These and other systems have been used to provide additional access for handicapped passengers but may not provide as efficient of a design as desired in an aircraft. For example, lavatories that use additional space in the cabin may be more difficult to reconfigure than desired. These systems also may limit desired access in other areas when a lavatory is reconfigured to use additional space in the cabin.

Also, lavatories that are convertible from two lavatories into a single lavatory also may be more difficult to reconfigure and may not be as efficient as desired. Therefore, it would be desirable to have a method and apparatus that take into account at least some of the issues discussed above, as well as other possible issues.

SUMMARY

In one illustrative embodiment, an apparatus comprises a wall and a urinal. The wall is physically associated with a fuselage for an aircraft. The urinal is positioned along the wall, the wall and urinal positioned within a specialty lavatory area module.

Another illustrative embodiment of the present disclosure provides a method. A specialty lavatory area module is identified. The specialty lavatory area module is placed adjacent to the fuselage.

Yet another illustrative embodiment of the present disclosure provides an apparatus. The apparatus comprises a galley, a first lavatory area, and a second lavatory area adjacent to the first lavatory area and the galley. The galley comprises a number of standard galley modules. The first lavatory area comprises a urinal, the urinal positioned along a wall of the first lavatory area, the wall adjacent to a fuselage. The second lavatory area comprises a toilet.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it may be desirable to maintain the same perimeter for a galley and a lavatory rather than encroaching on space in the cabin through changing the perimeter of the galley and the lavatory.

The illustrative embodiments also recognize and take into account that lavatories having a urinal rather than a toilet may be desirable. The illustrative embodiments recognize and take into account that a lavatory area having a urinal may have a smaller footprint than a lavatory area having a toilet. The illustrative embodiments further recognize and take into account that a urinal may be positioned in a number of locations in a lavatory area.

The illustrative embodiments further recognize and take into account that each purchaser may configure a lavatory area and a galley for an aircraft. The illustrative embodiments recognize that designing and building lavatory areas and galleys to purchaser specifications may be undesirable. For example, designing and building lavatory areas and galleys to purchaser specifications may be undesirably expensive. Further, designing and building lavatory areas and galleys to purchaser specifications may take an undesirable amount of time.

The illustrative embodiments recognize and take into account that designing and building lavatory areas and galleys to purchaser specifications may involve moving or creating new plumbing and electrical connections. The illustrative embodiments recognize and take into account that moving or creating new plumbing and electrical connections may undesirably increase at least one of manufacturing time and aircraft weight. Accordingly, the illustrative embodiments recognize and take into account that having standard plumbing and electrical connections on aircraft of the same model may reduce manufacturing time.

Thus, the illustrative embodiments provide a method and apparatus for a modular lavatory system. A lavatory structure comprises a wall physically associated with a fuselage for an aircraft and a urinal positioned along the wall.

Figure 1:
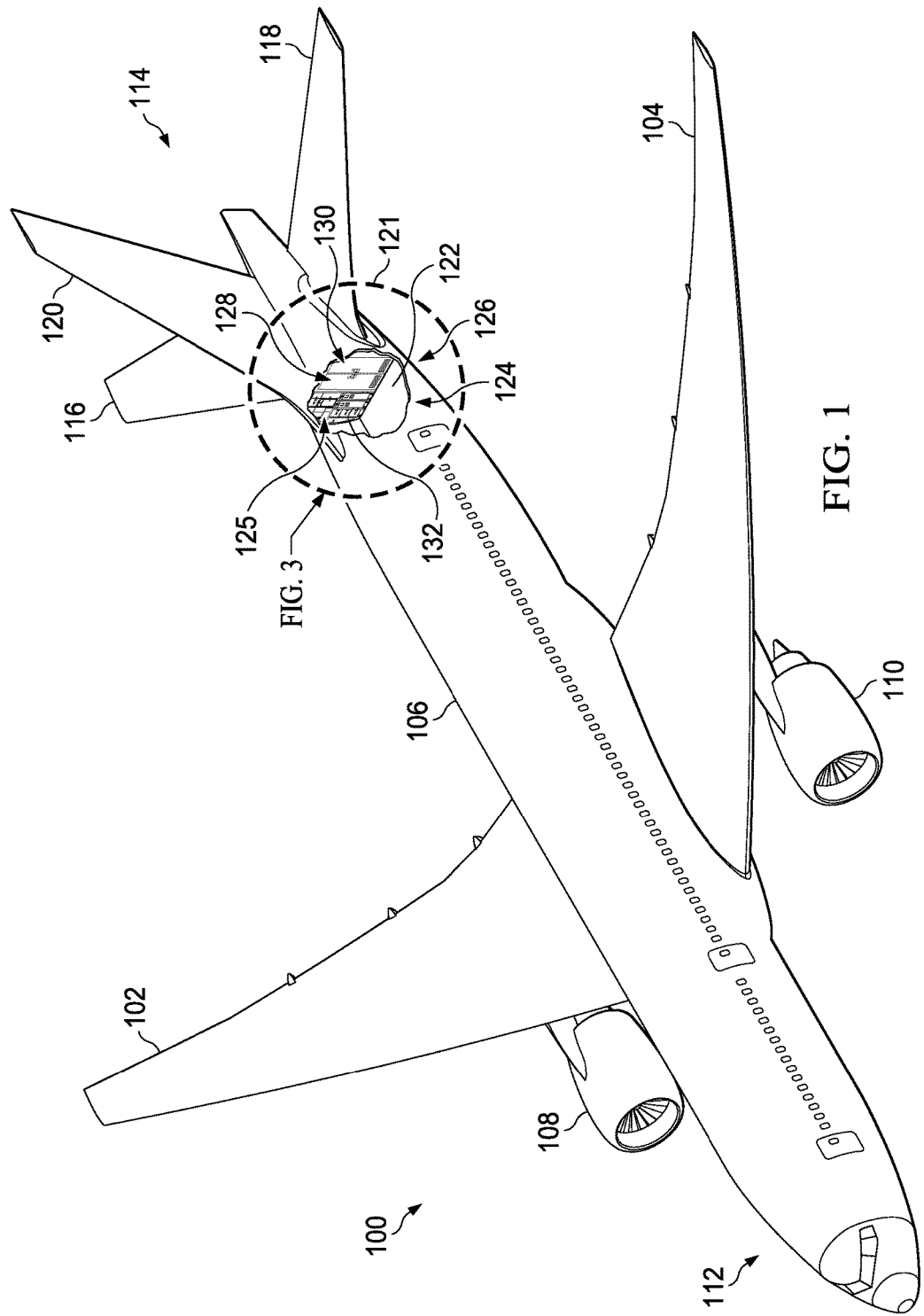
FIG. 1 is an illustration of an aircraft in which an illustrative embodiment may be implemented.

With reference now to the figures and, in particular, with reference to FIG. 1, an illustration of an aircraft is depicted in accordance with an illustrative embodiment. In this illustrative example, aircraft 100 has wing 102 and wing 104 attached to fuselage 106. Aircraft 100 includes engine 108 attached to wing 102 and engine 110 attached to wing 104.

Fuselage 106 has nose section 112 and tail section 114. Horizontal stabilizer 116, horizontal stabilizer 118, and vertical stabilizer 120 are attached to tail section 114 of fuselage 106.

Aircraft 100 is an example of an aircraft in which a modular lavatory system may be implemented in accordance with an illustrative embodiment. As depicted, section 121 illustrates an exposed view in which interior 122 of passenger cabin 124 in fuselage 106 of aircraft 100 is seen. In this illustrative example, section 121 of passenger cabin 124 includes galley 125 and lavatory structure 126 as seen in this exposed view.

In this illustrative example, lavatory structure 126 includes first lavatory area 128 and second lavatory area 130. These two lavatories are examples of lavatories that may be reconfigured to allow greater access to handicapped passengers in accordance with an illustrative embodiment. In particular, these lavatories may be reconfigured to provide a desired level of access to passengers in aircraft 100. For example, first lavatory area 128 and second lavatory area 130 may be reconfigured into a single lavatory in lavatory structure 126. In this manner, access may be provided to passengers such as those that may desire a greater amount of space, easier access, or some combination thereof. Further, the reconfiguration of these lavatories may occur without changing perimeter 132 for galley 125, first lavatory area 128, and second lavatory area 130. In other words, perimeter 132 remains fixed in these illustrative examples. At least part of perimeter 132 may be defined by fuselage 106.

In this illustrative example, galley 125 and lavatory structure 126 may be formed through modular assembly. In this illustrative example, galley 125 and lavatory structure 126 may be formed by a number of standard modules and a number of specialty modules. In this illustrative example, at least one of first lavatory area 128 and second lavatory area 130 may contain a urinal.

Figure 2:
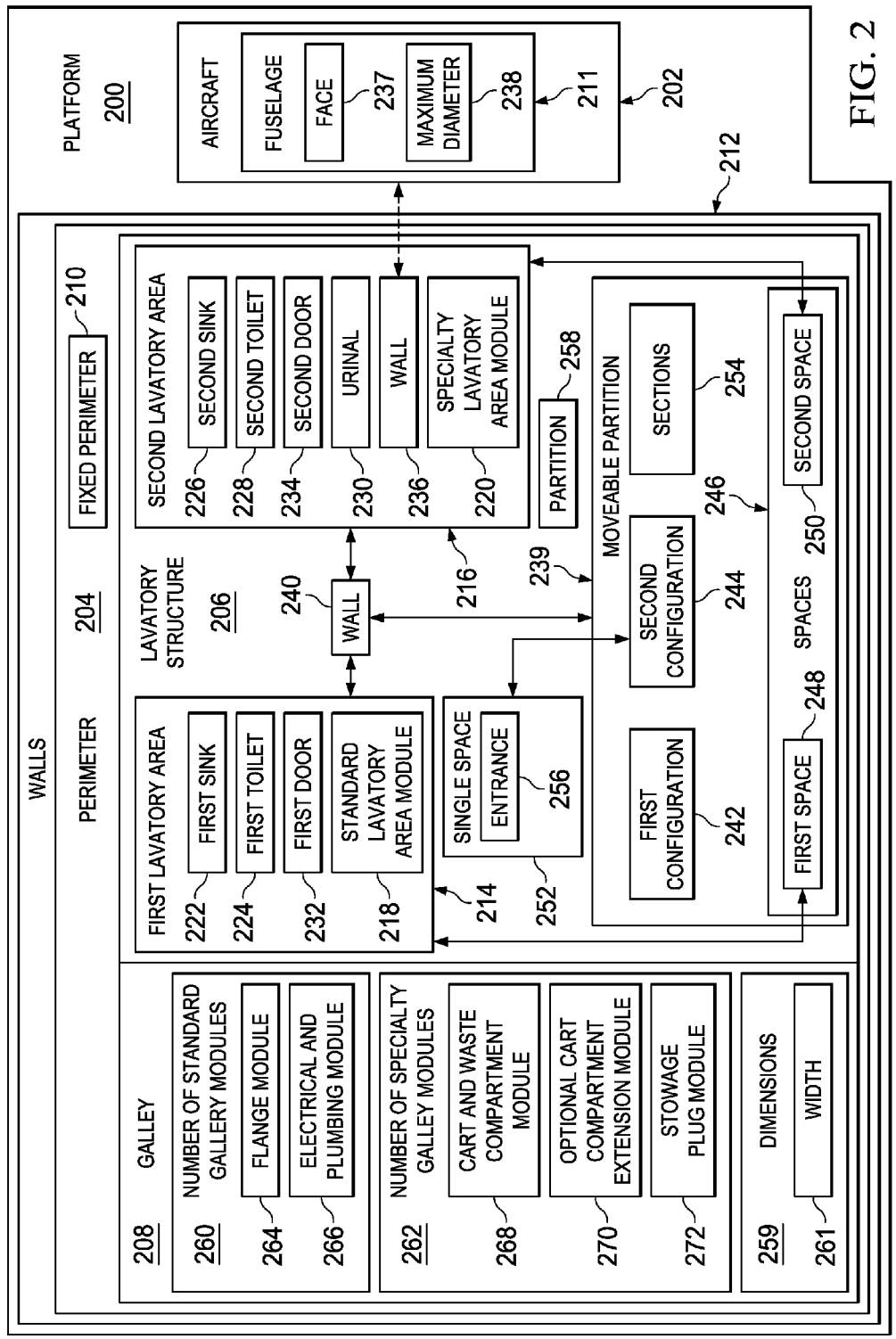
FIG. 2 is an illustration of a block diagram of a platform with a lavatory area in accordance with an illustrative embodiment.

With reference now to FIG. 2, an illustration of a block diagram of a platform with a lavatory area is depicted in accordance with an illustrative embodiment. In this depicted example, platform 200 may be aircraft 202. Aircraft 100 in FIG. 1 is an example of one physical implementation for aircraft 202 shown in block form in this figure.

As depicted, platform 200 includes perimeter 204. Perimeter 204 is a boundary around lavatory structure 206 and galley 208. In this illustrative example, perimeter 204 takes the form of fixed perimeter 210 that extends around lavatory structure 206 and galley 208. As depicted, perimeter 204 is fixed perimeter 210 because walls 212 forming perimeter 204 around lavatory structure 206 and galley 208 are fixed and do not move into other areas within lavatory structure 206, galley 208, or other areas within platform 200. In some illustrative examples, fixed perimeter 210 may take the form of fuselage 211 of aircraft 202. Fuselage 106 in FIG. 1 is an example of one physical implementation for fuselage 211 shown in block form in this figure.

Lavatory structure 206 includes first lavatory area 214 and second lavatory area 216. Lavatory structure 206 is an area within platform 200 in which first lavatory area 214 and second lavatory area 216 may be located. In this illustrative example, first lavatory area 214 and second lavatory area 216 are adjacent to each other.

In this illustrative example, first lavatory area 214 includes first sink 222 and first toilet 224. Second lavatory area 216 includes second sink 226 and one of second toilet 228 and urinal 230. As used herein, a toilet is a specialized receptacle for both urination and defecation thereinto. As used herein, a urinal is a specialized receptacle for urination only. Additionally, first lavatory area 214 has first door 232 and second lavatory area 216 has second door 234 located within walls 212.

Lavatory structure 206 may be formed through modular assembly. As depicted, first lavatory area 214 may be standard lavatory area module 218. Standard lavatory area module 218 may be present in all aircraft which are the same model as aircraft 202. As depicted, second lavatory area 216 may be specialty lavatory area module 220. Specialty lavatory area module 220 may be a module which is not present in all aircraft which are the same model as aircraft 202. For example, specialty lavatory area module 220 may be selected from a plurality of specialty lavatory area modules which could be implemented in second lavatory area 216. The plurality of specialty lavatory area modules may be different from each other based on at least one of size, shape, presence of second toilet 228, location of second toilet 228, presence of urinal 230, location of urinal 230, or location of second sink 226.

Second lavatory area 216 has wall 236. Wall 236 is physically associated with fuselage 211 of aircraft 202. When one component is "physically associated" with another component, the association is a physical association in the depicted examples. For example, a first component, a wall, may be considered to be physically associated with a second component, a fuselage, by being secured to the second component, bonded to the second component, mounted to the second component, welded to the second component, fastened to the second component, and/or connected to the second component in some other suitable manner. The first component also may be connected to the second component using a third component. The first component also may be considered to be physically associated with the second component by being formed as part of the second component, an extension of the second component, or both. Specifically, fuselage 211 may have face 237. Wall 236 may be physically associated with fuselage 211 by being against face 237 of fuselage 211.

In some illustrative examples, urinal 230 may be positioned along wall 236. In some illustrative examples, urinal 230 may be positioned at a height corresponding to maximum diameter 238 of fuselage 211. In some illustrative examples, second sink 226 may be positioned along wall 236. In some illustrative examples, second sink 226 may be positioned at a height corresponding to maximum diameter 238 of fuselage 211.

As depicted, moveable partition 239 is present in lavatory structure 206 and forms at least part of wall 240 between first lavatory area 214 and second lavatory area 216. In particular, moveable partition 239 is configured for use with first lavatory area 214 and second lavatory area 216. Moveable partition 239 is a structure that may be used to reconfigure space for first lavatory area 214 and second lavatory area 216 within walls 212.

Moveable partition 239 may be comprised of different types of materials. For example, moveable partition 239 may be comprised of a composite material, a metal, or some other suitable type of material.

Moveable partition 239 may have first configuration 242 and second configuration 244. In particular, moveable partition 239 may be moved between first configuration 242 and second configuration 244.

In these illustrative examples, when moveable partition 239 is in first configuration 242, moveable partition 239 forms at least a portion of wall 240. In first configuration 242, moveable partition 239 is configured to separate first lavatory area 214 and second lavatory area 216 into spaces 246. Spaces 246 are separate spaces for first lavatory area 214 and second lavatory area 216 within fixed perimeter 210 when moveable partition 239 is in first configuration 242. In particular, spaces 246 include first space 248 and second space 250. First space 248 is space within first lavatory area 214 within perimeter 204. Second space 250 is space within second lavatory area 216 within perimeter 204.

When moveable partition 239 is in second configuration 244, moveable partition 239 defines single space 252 for first lavatory area 214 and second lavatory area 216 instead of spaces 246. Single space 252 may provide additional room for passengers such as a family, a handicapped passenger, or other types of passengers who may require additional room within lavatory structure 206.

As depicted, moveable partition 239 may be comprised of sections 254. Sections 254 are configured to fold relative to each other in this illustrative example. The configuration of sections 254 and the manner in which they fold relative to each other may be selected such that undesired contact with structures within lavatory structure 206 may be reduced or avoided when sections 254 are folded to move moveable partition 239 between first configuration 242 and second configuration 244. For example, folding of sections 254 for moveable partition 239 may occur such that undesired contact with first sink 222 is avoided. Undesired contact may be, for example, any contact that results in inconsistencies in moveable partition 239, structures in lavatory structure 206, or both. In these illustrative examples, folding of sections 254 involves rotational movement of one or more of sections 254.

In the illustrative examples, first door 232 and second door 234 are configured to form entrance 256 for single space 252. Entrance 256 is without partition 258 between first door 232 and second door 234 when moveable partition 239 is in second configuration 244.

In particular, first door 232 is for first lavatory area 214 and second door 234 is for second lavatory area 216. As depicted, first door 232 and second door 234 are configured to move between an open position and a closed position. In the illustrative example, entrance 256 is a single passageway that is present in both first lavatory area 214 and second lavatory area 216 when first door 232 and second door 234 are in the open position. The single passageway is present in this example when moveable partition 239 is in second configuration 244.

Partition 258 is present when moveable partition 239 is in first configuration 242 in the illustrative example. In particular, moveable partition 239 may form partition 258 between first door 232 and second door 234 when moveable partition 239 is in first configuration 242 and divides lavatory structure 206 into first space 248 in first lavatory area 214 and second space 250 in second lavatory area 216.

As depicted, galley 208 is adjacent to lavatory structure 206. Specifically, galley 208 is adjacent to first lavatory area 214. Galley 208 has dimensions 259. Dimensions 259 may be affected by fuselage 211 and lavatory structure 206. Specifically, dimensions 259 may change as dimensions of lavatory structure 206 change. As the width of lavatory structure 206 increases, width 261 of galley 208 decreases.

Galley 208 has number of standard galley modules 260 and number of specialty galley modules 262. Number of standard galley modules 260 may be galley modules present on all aircraft of the same model as aircraft 202.

Number of standard galley modules 260 may include flange module 264 and electrical and plumbing module 266. Flange module 264 is positioned between perimeter 204 and the remaining modules of number of standard galley modules 260 and number of specialty galley modules 262. Flange module 264 may be a structural module to position the remaining modules of galley 208.

Electrical and plumbing module 266 connects to electrical and plumbing connections in aircraft 202. Electrical and plumbing module 266 contains functional compartments. After connecting electrical and plumbing module 266 to electrical and plumbing connections, the functional compartments are operational. Functional compartments may include at least one of an oven, a beverage maker, a water spigot, a sink, a work light, a water heater, an electrical control panel, a microwave, or other desirable type of functional compartment.

As electrical and plumbing module 266 is a standard galley module of number of standard galley modules 260, the electrical and plumbing connections in aircraft 202 may be standard connections. In other words, electrical and plumbing connections in aircraft 202 need not be modified to accommodate galley 208.

However, electrical and plumbing module 266 may accommodate various layouts of electrical and plumbing connections. In some illustrative examples, electrical and plumbing module 266 may include adapters to connect electrical and plumbing module 266 to a variety of electrical and plumbing connections.

Number of specialty galley modules 262 may be galley modules which are not necessarily used on all aircraft of the same model as aircraft 202. Specifically, number of specialty galley modules 262 may offer different options for the same type of module on aircraft of the same model.

Specialty galley modules 262 may include cart and waste compartment module 268, optional cart compartment extension module 270, and stowage plug module 272. Cart and waste compartment module 268 is adjacent to first lavatory area 214 and electrical and plumbing module 266. Cart and waste compartment module 268 may include at least one of a number of carts, a number of containers, an ice drawer, and a waste compartment. Cart and waste compartment module 268 may be selected from a plurality of different cart and waste compartment module options. In some illustrative examples, cart and waste compartment module options may provide possibilities of a different number of accommodated carts. In some illustrative examples, cart and waste compartment module options may provide possibilities of different widths.

Optional cart compartment extension module 270 may be adjacent to cart and waste compartment module 268. Optional cart compartment extension module 270 may increase the number of carts which can be stored in galley 208.

Stowage plug module 272 is positioned between electrical and plumbing module 266 and first lavatory area 214. Stowage plug module 272 fills the space between electrical and plumbing module 266 and first lavatory area 214. As electrical and plumbing module 266 is a standard lavatory area module, the width of electrical and plumbing module 266 does not change. As lavatory structure 206 increases in width, stowage plug module 272 decreases in width. In some illustrative embodiments, stowage plug module 272 may contain usable stowage containers. In some illustrative embodiments, stowage plug module 272 may be too narrow to provide usable stowage containers. In these illustrative embodiments, stowage plug module 272 may only act to fill the space between electrical and plumbing module 266 and first lavatory area 214.

The illustration of platform 200 and lavatory structure 206 in platform 200 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although platform 200 has been described as being implemented as aircraft 202, platform 200 may be implemented in other forms. Platform 200 may be, for example, a mobile platform, a stationary platform, a land-based structure, an aquatic-based structure, or a space-based structure. More specifically, platform 200 may be a surface ship, a train, a spacecraft, a space station, a submarine, a power plant, a house, an office building, a manufacturing facility, a building, a theatre, or other suitable platforms.

As another illustrative example, although lavatory structure 206 has been described as defining first lavatory area 214 and second lavatory area 216 with walls 212 with perimeter 204 within fixed perimeter 210, perimeter 204 may not be fixed in other illustrative examples.

Figure 3:
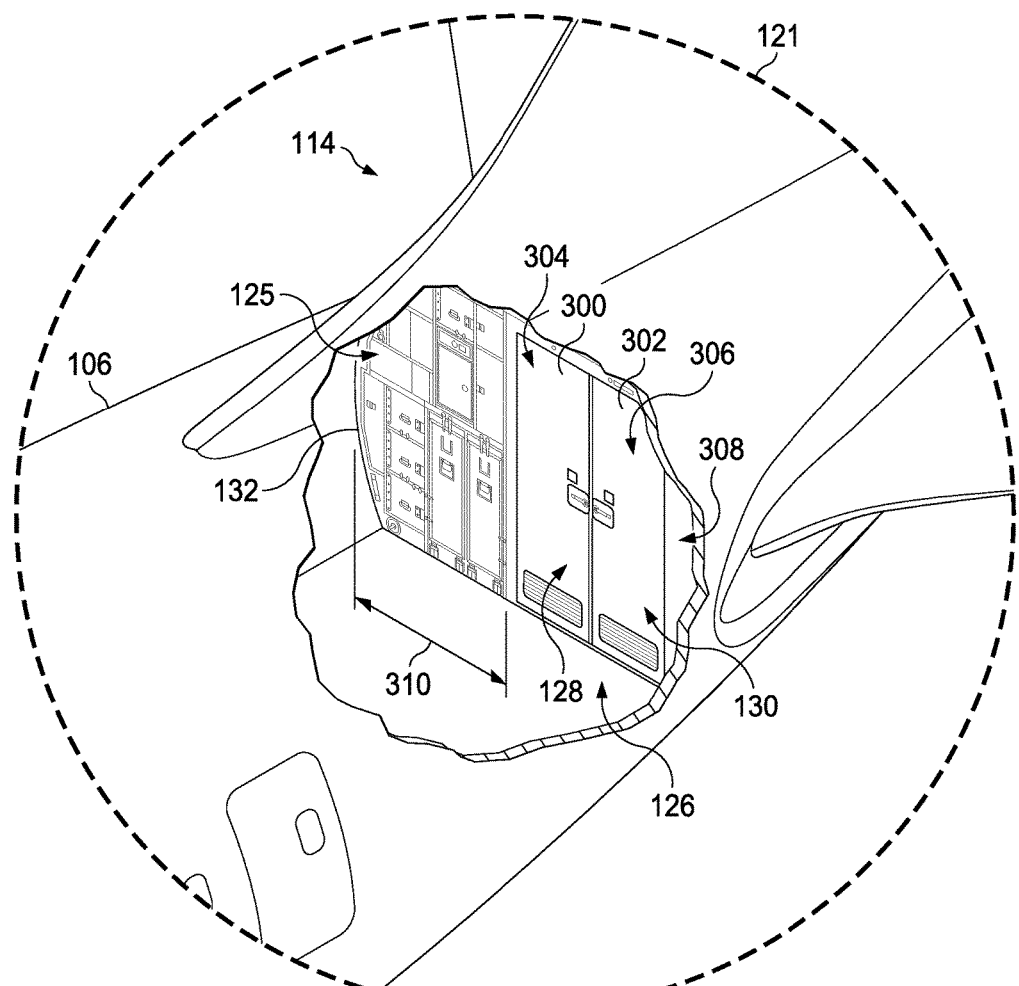
FIG. 3 is an illustration of a lavatory area in an aircraft in accordance with an illustrative embodiment.

With reference now to FIG. 3, an illustration of a lavatory area in an aircraft is depicted in accordance with an illustrative embodiment. In this depicted example, a more detailed illustration of section 121 in fuselage 106 of aircraft 100 from FIG. 1 is shown. Some components for first lavatory area 128 and second lavatory area 130 can be seen in this exposed view of lavatory structure 126. In particular, first lavatory area 128 and second lavatory area 130 are examples of physical implementations for first lavatory area 214 and second lavatory area 216 in FIG. 2.

As depicted, first lavatory area 128 includes first door 300 and second lavatory area 130 includes second door 302. Galley 125 is located adjacent to lavatory structure 126. As can be seen in this illustrative example, first lavatory area 128, second lavatory area 130, and galley 125 are located within perimeter 132.

In this illustrative example, first lavatory area 128 is standard lavatory module 304. Standard lavatory module 304 includes a toilet. In this illustrative example, second lavatory area 130 is specialty lavatory module 306. In this illustrative example, second lavatory area 130 may have a urinal.

In some illustrative examples, second lavatory area 130 may have a urinal positioned at height 308. Height 308 corresponds to a maximum diameter of fuselage 106.

As a result of second lavatory area 130 comprising specialty lavatory module 306, galley 125 has width 310. Width 310 may be increased or decreased based on a selected specialty lavatory module for specialty lavatory module 306.

Figure 4:
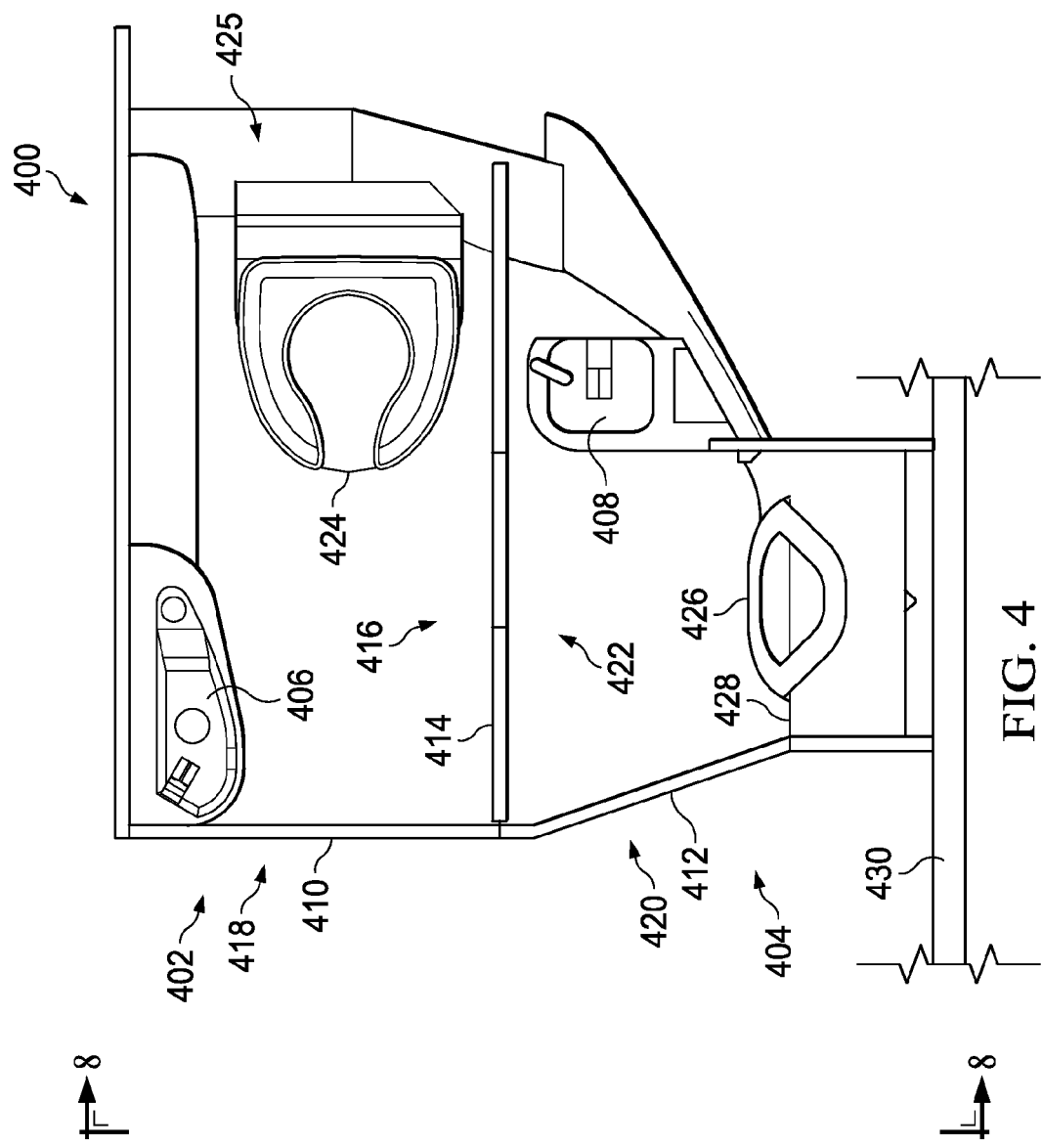
FIG. 4 is an illustration of a plan view of a first embodiment of a first lavatory area and a second lavatory area in accordance with an illustrative embodiment.
Figure 5:
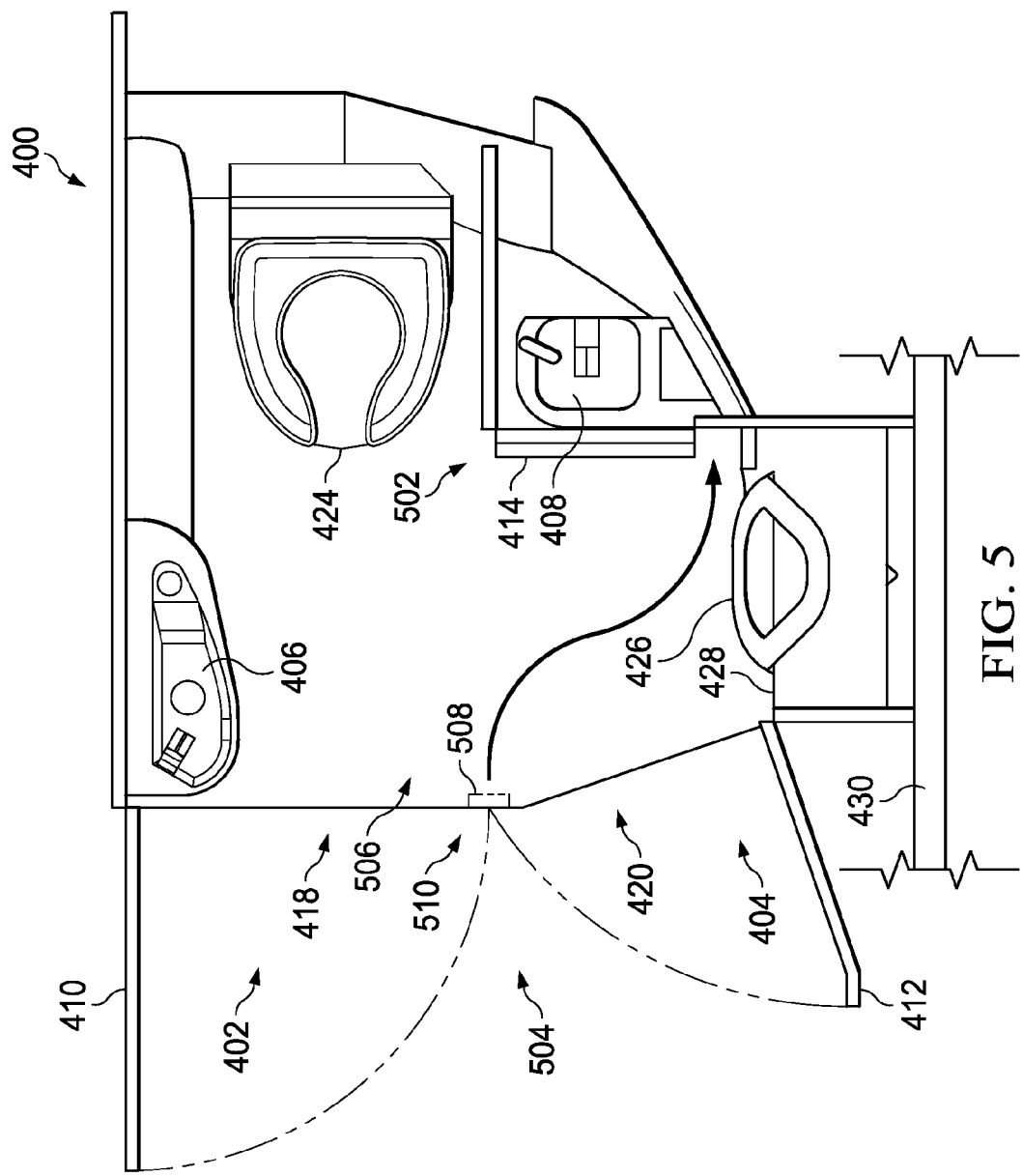
FIG. 5 is an illustration of a plan view of the first embodiment of the first lavatory area and the second lavatory area with a moveable partition folded into a second configuration in accordance with an illustrative embodiment.
Figure 6:
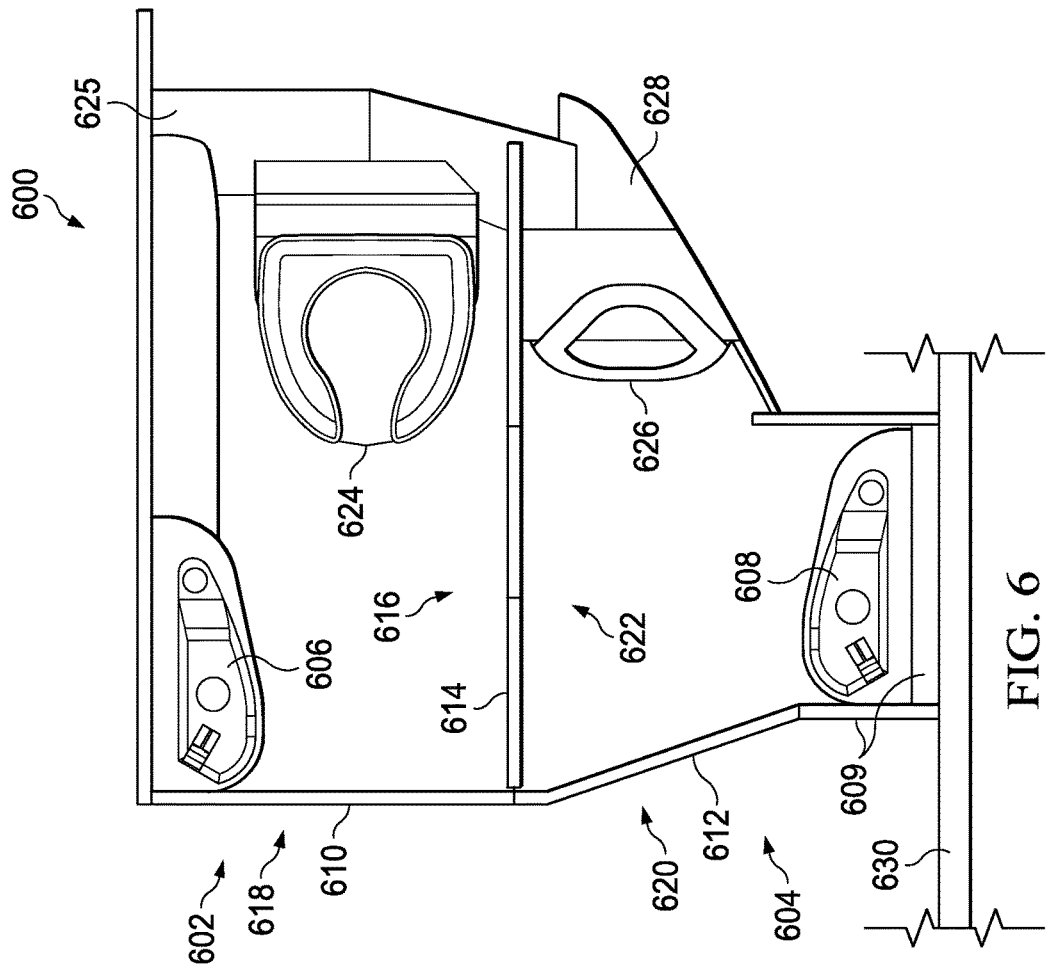
FIG. 6 is an illustration of a plan view of a second embodiment of a first lavatory area and a second lavatory area in accordance with an illustrative embodiment.
Figure 7:
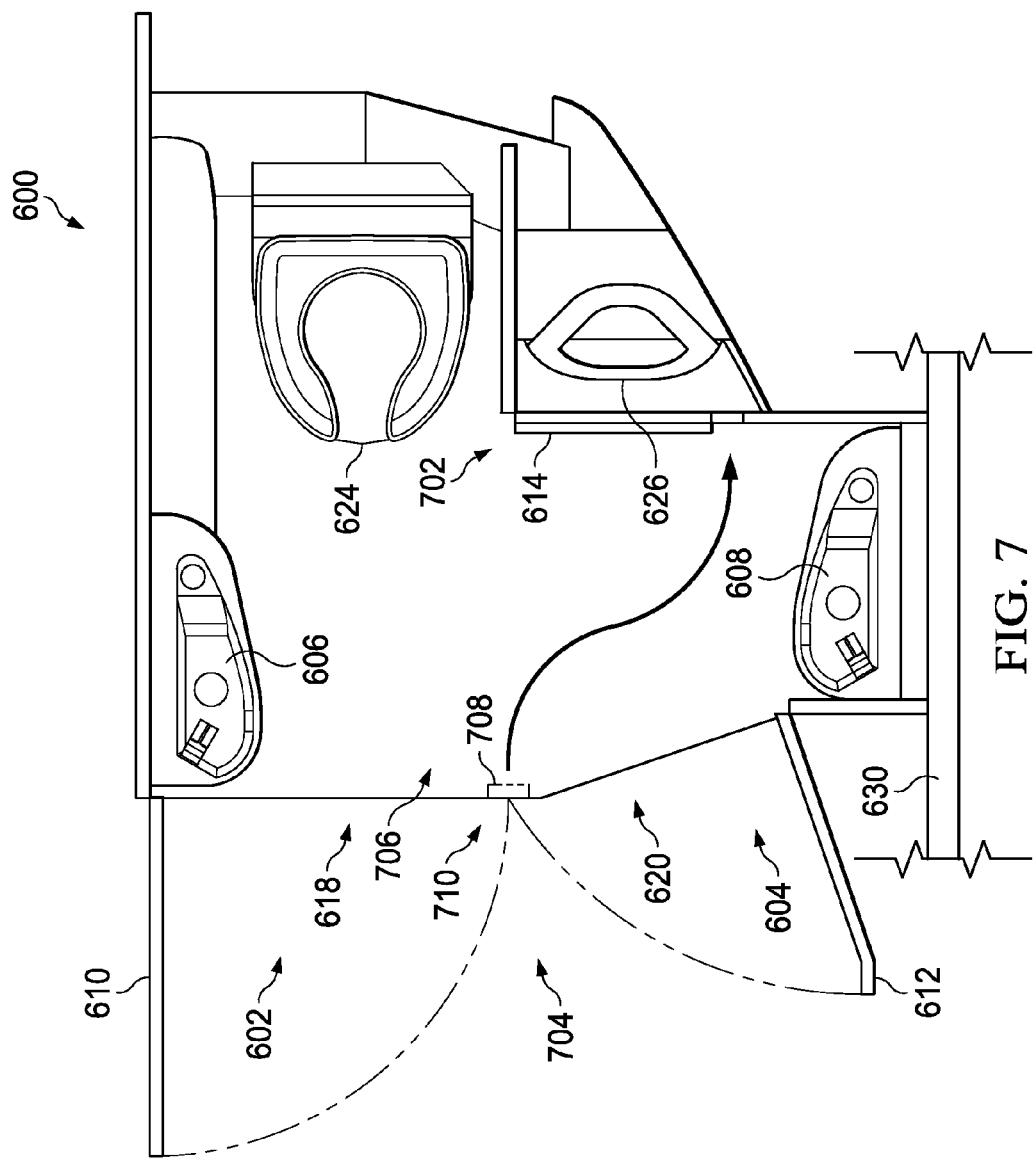
FIG. 7 is an illustration of a plan view of the second embodiment of the first lavatory area and the second lavatory area with a moveable partition folded into a second configuration in accordance with an illustrative embodiment.
Figure 8:
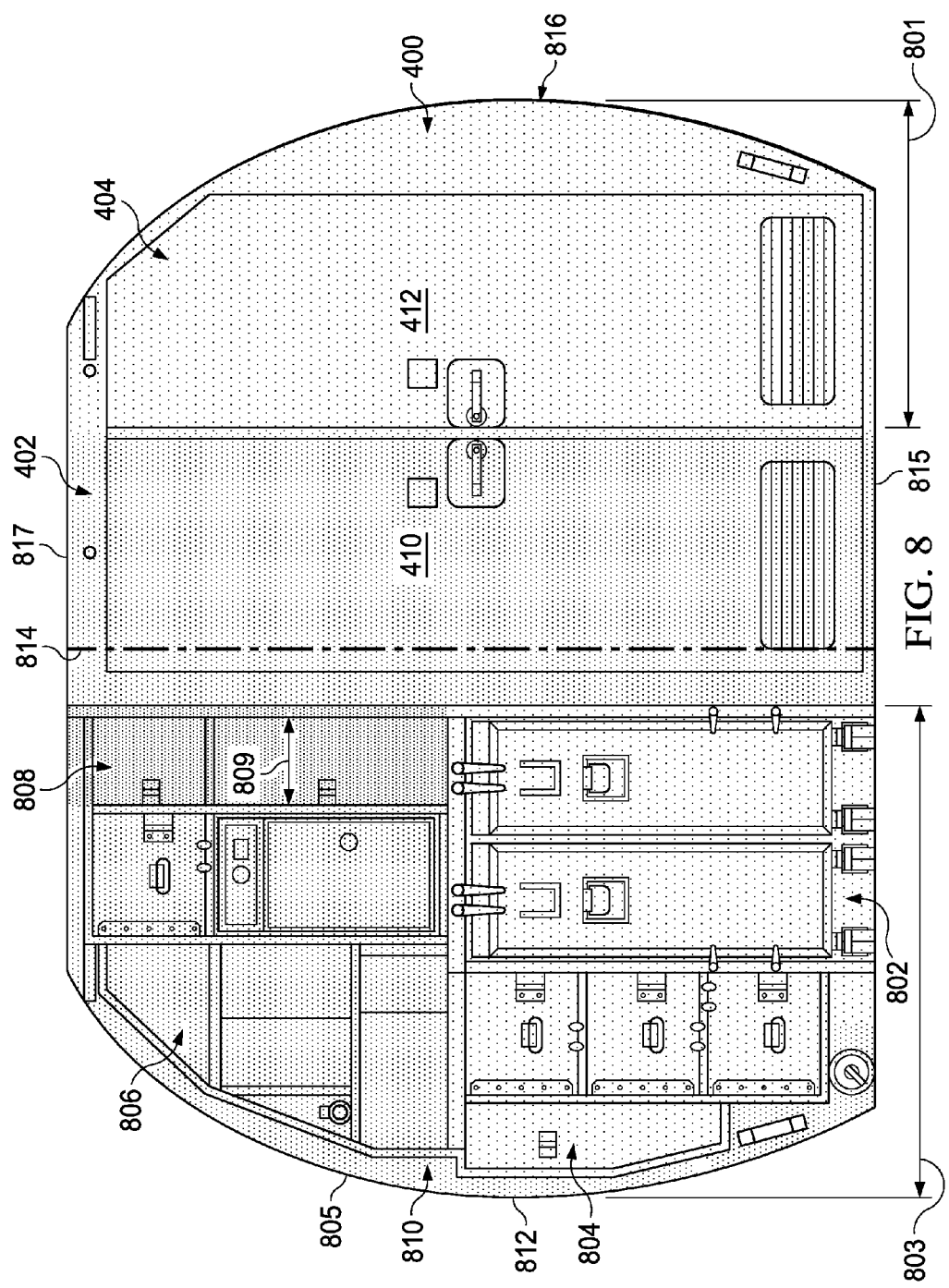
FIG. 8 is an illustration of a front view of a lavatory structure and a galley in accordance with an illustrative embodiment.

FIGS. 4-8 depict illustrations of a lavatory structure. Specifically, FIGS. 4-8 depict a lavatory structure having a urinal. FIGS. 4-5 depict a first physical implementation of lavatory structure 206 of FIG. 2 having a urinal. FIGS. 6-7 depict a second physical implementation of a lavatory structure 206 of FIG. 2 having a urinal. FIG. 8 depicts an illustration of a front view of a galley and a lavatory structure having a urinal.

With reference now specifically to FIG. 4, an illustration of a first embodiment of a plan view of a first lavatory area and a second lavatory area is depicted in accordance with an illustrative embodiment. Specifically, a plan view of lavatory structure 400 including first lavatory area 402 and second lavatory area 404 is shown in this figure. Lavatory structure 400 is an example of one physical implementation for lavatory structure 206 of FIG. 2.

In this view, first sink 406 is shown in first lavatory area 402. Additionally, second sink 408 is shown in second lavatory area 404. As depicted, first door 410 is a door for first lavatory area 402. Second door 412 is a door for second lavatory area 404.

In this illustrative example, first door 410 and second door 412 are shown as closed. Each door may be individually opened to provide access to one of the lavatories when moveable partition 414 is in first configuration 416. For example, when first door 410 is in an open position, a passenger may enter first lavatory area 402 through first opening 418. As another example, when second door 412 is in an open position, a passenger may enter second lavatory area 404 through second opening 420.

As depicted, moveable partition 414 is comprised of sections 422. In these illustrative examples, these sections are configured to fold relative to each other when moveable partition 414 moves between first configuration 416 and a second configuration. These sections also may be referred to as foldable sections in the illustrative example. The configuration of sections 422 is designed such that sections 422 for moveable partition 414 fold in a manner that avoids undesired contact with structures in first lavatory area 402 and second lavatory area 404.

As depicted, moveable partition 414 is shown in first configuration 416. In first configuration 416, moveable partition 414 separates first lavatory area 402 and second lavatory area 404 into separate spaces.

As depicted, first lavatory area 402 has first toilet 424. First toilet 424 is positioned along wall 425. Wall 425 is associated with a tail section of an aircraft.

Second lavatory area 404 has urinal 426. Urinal 426 is positioned along wall 428. Wall 428 is associated with fuselage 430. Positioning urinal 426 along wall 428 may decrease the footprint of second lavatory area 404. More specifically, positioning urinal 426 along wall 428 may decrease the width of second lavatory area 404 as seen in a front view. In some illustrative examples, urinal 426 may be positioned at a height corresponding to a maximum diameter of fuselage 430.

First lavatory area 402 may be a standard lavatory area module. In other words, components and locations of components within first lavatory area 402 may be a result of a standard lavatory area module. Specifically, first sink 406, first toilet 424, and first door 410, as well as their respective locations, may be a result of a standard lavatory area module.

Second lavatory area 404 may be a specialty lavatory area module. In other words, components and locations of components within second lavatory area 404 may be a result of a selected specialty lavatory area module. Specifically, second sink 408, urinal 426, and second door 412, as well as their respective locations, may be a result of a selected specialty lavatory area module.

Turning now to FIG. 5, an illustration of a plan view of the first embodiment of the first lavatory area and the second lavatory area with a moveable partition folded into a second configuration is depicted in accordance with an illustrative embodiment. Specifically, FIG. 5 is an illustration of first lavatory area 402 and second lavatory area 404 with moveable partition 414 placed into second configuration 502.

When moveable partition 414 is in second configuration 502, first door 410 and second door 412 may both be opened to form single entrance 504. Single entrance 504 is an entrance without an obstruction such as a column that forms a partition between first opening 418 and second opening 420.

When moveable partition 414 is in second configuration 502, single space 506 is present within lavatory structure 400. In this manner, additional space may be provided for passengers who may desire or may need more space than provided by first lavatory area 402 or second lavatory area 404 alone when moveable partition 414 is in first configuration 416 in FIG. 4.

As depicted, when moveable partition 414 is in second configuration 502, moveable partition 414 is positioned against second sink 408. In second configuration 502, second sink 408 is inaccessible due to moveable partition 414. When moveable partition 414 is in second configuration 502, first sink 406, first toilet 424, and urinal 426 are accessible.

As can be seen, moveable structure 508 blocks gap 510 between first door 410 and second door 412 when first door 410 and second door 412 are in a closed position. Normally, gap 510 is filled by moveable partition 414 when moveable partition 414 is in first configuration 416 shown in FIG. 4.

In this illustrative example, moveable structure 508 may be comprised of various materials. For example, moveable structure 508 may be comprised of at least one of a rigid plastic, metal, a composite material, aluminum, steel, or some other suitable type of material. Moveable structure 508 may have a shape such as a beam, an "I" shape, a "U" shape, or some other suitable shape that may have a length. As depicted, the length may be about the height of first door 410.

In second configuration 502, moveable structure 508 may be moved in place to fill gap 510. Additionally, moveable structure 508 also may be configured to lock first door 410 and second door 412 when first door 410 and second door 412 are in a closed position and moveable structure 508 has been moved to fill gap 510.

With reference now specifically to FIG. 6, an illustration of a second embodiment of a plan view of a first lavatory area and a second lavatory area is depicted in accordance with an illustrative embodiment. Specifically, a plan view of lavatory structure 600, including first lavatory area 602 and second lavatory area 604, is shown in this figure. Lavatory structure 600 is an example of one physical implementation for lavatory structure 206 of FIG. 2.

In this view, first sink 606 is shown in first lavatory area 602. Additionally, second sink 608 is shown in second lavatory area 604. Second sink 608 is positioned along wall 609. Wall 609 is associated with fuselage 630. Positioning second sink 608 along wall 609 may decrease the footprint of second lavatory area 604. In some illustrative examples, second sink 608 may be positioned at a height corresponding to a maximum diameter of fuselage 630.

As depicted, first door 610 is a door for first lavatory area 602. Second door 612 is a door for second lavatory area 604.

In this illustrative example, first door 610 and second door 612 are shown as closed. Each door may be individually opened from the closed position to provide access to one of the lavatories when moveable partition 614 is in first configuration 616. For example, when first door 610 is in an open position, a passenger may enter first lavatory area 602 through first opening 618. As another example, when second door 612 is in an open position, a passenger may enter second lavatory area 604 through second opening 620.

As depicted, moveable partition 614 is comprised of sections 622. In these illustrative examples, these sections are configured to fold relative to each other when moveable partition 614 moves between first configuration 616 and a second configuration. These sections also may be referred to as foldable sections in the illustrative example. The configuration of sections 622 is designed such that sections 622 for moveable partition 614 fold in a manner that avoids undesired contact with structures in first lavatory area 602 and second lavatory area 604.

As depicted, moveable partition 614 is shown in first configuration 616. In first configuration 616, moveable partition 614 separates first lavatory area 602 and second lavatory area 604 into separate spaces.

As depicted, first lavatory area 602 has first toilet 624. First toilet 624 is positioned along wall 625. Wall 625 is associated with a tail section of an aircraft.

Second lavatory area 604 has urinal 626. Urinal 626 is positioned along wall 628. Wall 628 is associated with a tail section of an aircraft.

First lavatory area 602 may be a standard lavatory area module. In other words, components and locations of components within first lavatory area 602 may be a result of a standard lavatory area module. Specifically, first sink 606, first toilet 624, and first door 610, as well as their respective locations, may be a result of a standard lavatory area module.

Second lavatory area 604 may be a specialty lavatory area module. In other words, components and locations of components within second lavatory area 604 may be a result of a selected specialty lavatory area module. Specifically, second sink 608, urinal 626, and second door 612, as well as their respective locations, may be a result of a selected specialty lavatory area module.

Turning now to FIG. 7, an illustration of the second embodiment of a plan view of the first lavatory area and the second lavatory area with a moveable partition folded into a second configuration is depicted in accordance with an illustrative embodiment. Specifically, FIG. 7 is an illustration of first lavatory area 602 and second lavatory area 604 with moveable partition 614 placed into second configuration 702.

When moveable partition 614 is in second configuration 702, first door 610 and second door 612 may both be opened to form single entrance 704. Single entrance 704 is an entrance without an obstruction such as a column that forms a partition between first opening 618 and second opening 620.

When moveable partition 614 is in second configuration 702, single space 706 is present within lavatory structure 600. In this manner, additional space may be provided for passengers who may desire or may need more space than provided by first lavatory area 602 or second lavatory area 604 alone when moveable partition 614 is in first configuration 616 in FIG. 6.

As depicted, when moveable partition 614 is in second configuration 702, moveable partition 614 is positioned against urinal 626. In second configuration 702, urinal 626 is inaccessible due to moveable partition 614. When moveable partition 614 is in second configuration 702, first sink 606, first toilet 624, and second sink 608 are accessible.

As can be seen, moveable structure 708 blocks gap 710 between first door 610 and second door 612 when first door 610 and second door 612 are in a closed position. Normally, gap 710 is filled by moveable partition 614 when moveable partition 614 is in first configuration 616.

In this illustrative example, moveable structure 708 may be comprised of various materials. For example, moveable structure 708 may be comprised of at least one of a rigid plastic, metal, a composite material, aluminum, steel, or some other suitable type of material. Moveable structure 708 may have a shape such as a beam, an "I" shape, a "U" shape, or some other suitable shape that may have a length. As depicted, the length may be about the height of first door 610.

In second configuration 702, moveable structure 708 may be moved in place to fill gap 710. Additionally, moveable structure 708 also may be configured to lock first door 610 and second door 612 when first door 610 and second door 612 are in a closed position and moveable structure 708 has been moved to fill gap 710.

With reference now to FIG. 8, an illustration of a front view of a lavatory structure and a galley is depicted in accordance with an illustrative embodiment. Specifically, FIG. 8 is an illustration of first lavatory area 402 and second lavatory area 404 of FIG. 4 from direction 8-8 with an associated galley. Lavatory structure 400 and galley 802 are examples of one physical implementation for lavatory structure 206 and galley 208 of FIG. 2. In particular, first lavatory area 402 and second lavatory area 404 are examples of physical implementations for first lavatory area 214 and second lavatory area 216 in FIG. 2.

As depicted, first lavatory area 402 includes first door 410 and second lavatory area 404 includes second door 412. Galley 802 is located adjacent to lavatory structure 400. As can be seen in this illustrative example, first lavatory area 402, second lavatory area 404, and galley 802 are located within fixed perimeter 805. As galley 802 and lavatory structure 400 are located within fixed perimeter 805, changing the size of lavatory structure 400 necessarily changes the size of galley 802.

In this illustrative example, first lavatory area 402 is a standard lavatory module. In this illustrative example, second lavatory area 404 is a specialty lavatory module. Width 801 of second lavatory area 404 affects width 803 of galley 802. Specifically, as width 801 of second lavatory area 404 increases, width 803 of galley 802 decreases.

In some illustrative examples, at least one of a urinal or a sink of second lavatory area 404 may be positioned at height 816. Height 816 corresponds to a maximum diameter of fuselage 812. Positioning a urinal or a sink of second lavatory area 404 at height 816 may affect width 801. Specifically, positioning a urinal or a sink of second lavatory area 404 at a height other than height 816 may increase width 801.

Further, selection of a specialty lavatory area module affects width 801 of second lavatory area 404. Each specialty lavatory area module has its own respective width. Some widths may be greater than or less than width 801.

Galley 802 has standard galley modules and specialty galley modules. Galley 802 has cart and waste compartment module 804, electrical and plumbing module 806, stowage plug module 808, and flange 810. Cart and waste compartment module 804 and stowage plug module 808 are specialty galley modules. At least one of the size, layout, and components of cart and waste compartment module 804 and stowage plug module 808 may be affected by width 803 of galley 802. Accordingly, at least one of the size, layout, and components of cart and waste compartment module 804 and stowage plug module 808 may be affected by width 801 of second lavatory area 404. Specifically, width 809 of stowage plug module 808 decreases as width 801 of second lavatory area 404 increases.

Electrical and plumbing module 806 and flange 810 of galley 802 are standard galley modules. Electrical and plumbing module 806 may be present in all aircraft of the same model. Further, flange 810 may be present in all aircraft of the same model. Size and content of electrical and plumbing module 806 and flange 810 of galley 802 are not based on width 803 of galley 802. Further, electrical and plumbing module 806 and flange 810 of galley 802 do not change based on changing width 803 of galley 802.

As depicted, fixed perimeter 805 is formed by fuselage 812. In this illustrative example, fuselage 812 has center point 814. Center point 814 runs through floor 815 and ceiling 817 and divides fuselage 812 into two approximately equal sections. As depicted, center point 814 is positioned near the left side of first lavatory area 402. The position of center point 814 relative to first lavatory area 402 may change based on width 801 of second lavatory area 404.

Figure 9:
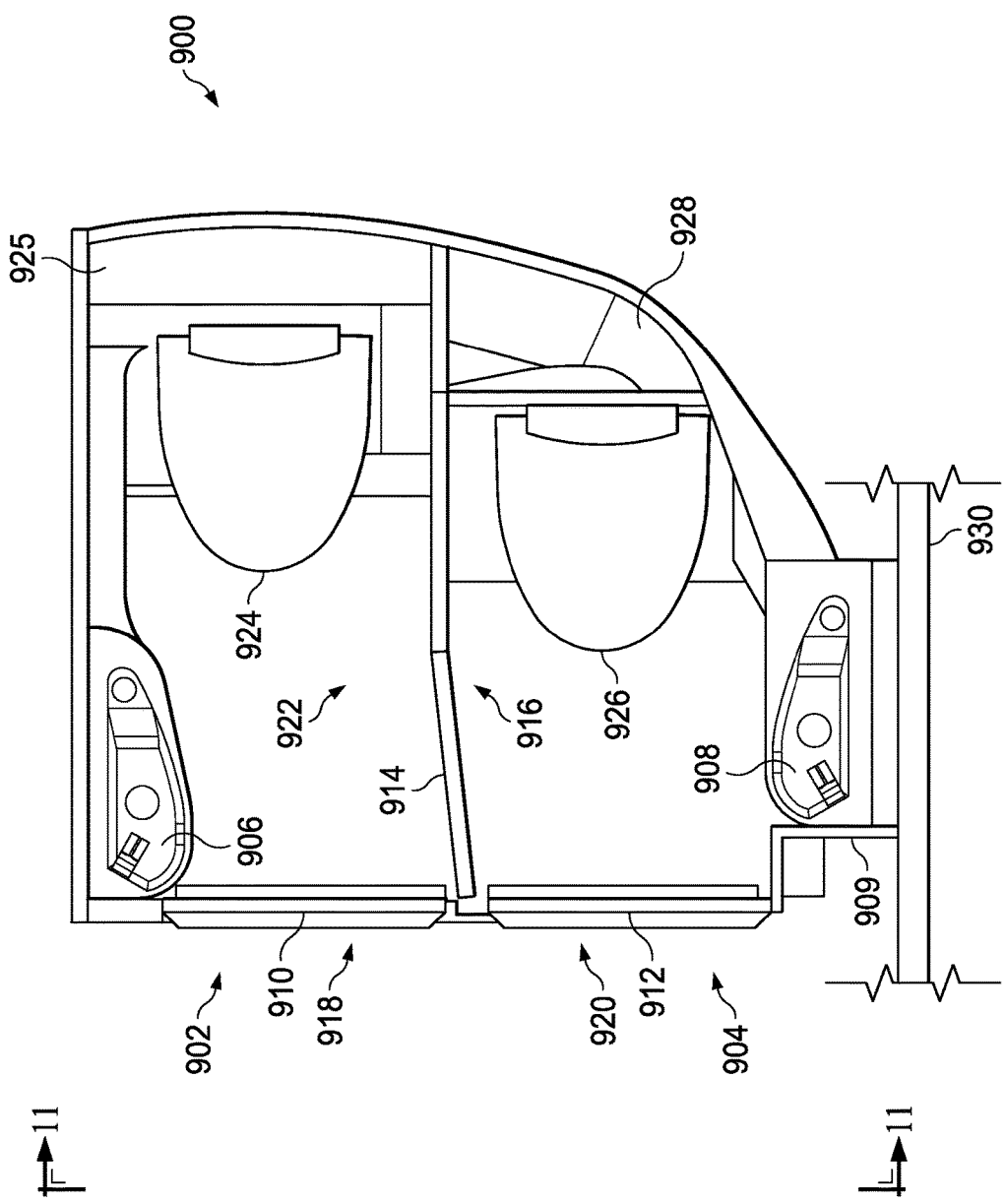
FIG. 9 is an illustration of a plan view of a third embodiment of a first lavatory area and a second lavatory area in accordance with an illustrative embodiment.

With reference now to FIG. 9, an illustration of a third embodiment of a plan view of a first lavatory area and a second lavatory area is depicted in accordance with an illustrative embodiment. Specifically, a plan view of lavatory structure 900, including first lavatory area 902 and second lavatory area 904, is shown in this figure. Lavatory structure 900 is an example of one physical implementation for lavatory structure 206 of FIG. 2.

In this view, first sink 906 is shown in first lavatory area 902. Additionally, second sink 908 is shown in second lavatory area 904. Second sink 908 is positioned along wall 909. Wall 909 is associated with fuselage 930. Positioning second sink 908 along wall 909 may decrease the footprint of second lavatory area 904. In some illustrative examples, second sink 908 may be positioned at a height corresponding to a maximum diameter of fuselage 930.

As depicted, first door 910 is a first door for first lavatory area 902. Second door 912 is a door for second lavatory area 904.

In this illustrative example, first door 910 and second door 912 are shown as closed. Each door may be individually opened to provide access to one of the lavatories when moveable partition 914 is in first configuration 916. For example, when first door 910 is in an open position, a passenger may enter first lavatory area 902 through first opening 918. As another example, when second door 912 is in an open position, a passenger may enter second lavatory area 904 through second opening 920.

As depicted, moveable partition 914 is comprised of sections 922. In these illustrative examples, these sections are configured to fold relative to each other when moveable partition 914 moves between first configuration 916 and a second configuration. These sections also may be referred to as foldable sections in the illustrative example. The configuration of sections 922 is designed such that sections 922 for moveable partition 914 fold in a manner that avoids undesired contact with structures in first lavatory area 902 and second lavatory area 904.

As depicted, moveable partition 914 is shown in first configuration 916. In first configuration 916, moveable partition 914 separates first lavatory area 902 and second lavatory area 904 into separate spaces.

As depicted, first lavatory area 902 has first toilet 924. First toilet 924 is positioned along wall 925. Wall 925 is associated with a tail section of an aircraft.

Second lavatory area 904 has second toilet 926. Second toilet 926 is positioned along wall 928. Wall 928 is associated with the tail section of the aircraft.

First lavatory area 902 may be a standard lavatory area module. In other words, components and locations of components within first lavatory area 902 may be a result of a standard lavatory area module. Specifically, first sink 906, first toilet 924, and first door 910, as well as their respective locations, may be a result of a standard lavatory area module.

Second lavatory area 904 may be a specialty lavatory area module. In other words, components and locations of components within second lavatory area 904 may be a result of a selected specialty lavatory area module. Specifically, second sink 908, second toilet 926, and second door 912, as well as their respective locations, may be a result of a selected specialty lavatory area module.

Figure 10:
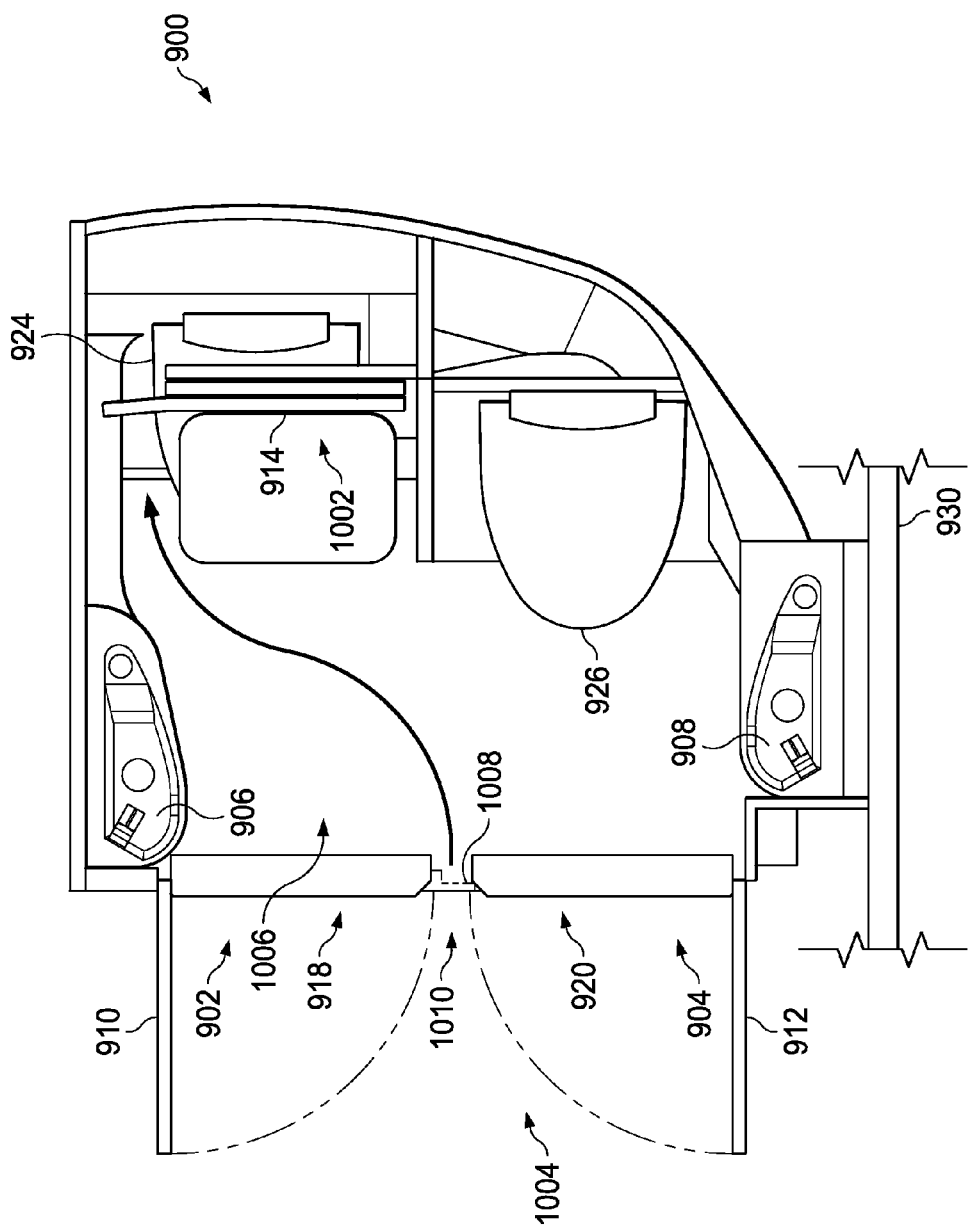
FIG. 10 is an illustration of a plan view of the third embodiment of the first lavatory area and the second lavatory area with a moveable partition folded into a second configuration in accordance with an illustrative embodiment.

Turning now to FIG. 10, an illustration of the third embodiment of a plan view of the first lavatory area and the second lavatory area with a moveable partition folded into a second configuration is depicted in accordance with an illustrative embodiment. Specifically, FIG. 10 is an illustration of first lavatory area 902 and second lavatory area 904 with moveable partition 914 placed into second configuration 1002.

When moveable partition 914 is in second configuration 1002, first door 910 and second door 912 may both be opened to form single entrance 1004. Single entrance 1004 is an entrance without an obstruction such as a column that forms a partition between first opening 918 and second opening 920.

When moveable partition 914 is in second configuration 1002, single space 1006 is present within lavatory structure 900. In this manner, additional space may be provided for passengers who may desire or may need more space than provided by first lavatory area 902 or second lavatory area 904 alone when moveable partition 914 is in first configuration 916.

As depicted, when moveable partition 914 is in second configuration 1002, moveable partition 914 is associated with first toilet 924. In second configuration 1002, first toilet 924 is inaccessible due to moveable partition 914. When moveable partition 914 is in second configuration 1002, first sink 906, second toilet 926, and second sink 908 are accessible.

As can be seen, moveable structure 1008 blocks gap 1010 between first door 910 and second door 912 when first door 910 and second door 912 are in a closed position. Normally, gap 1010 is filled by moveable partition 914 when moveable partition 914 is in first configuration 916.

In this illustrative example, moveable structure 1008 may be comprised of various materials. For example, moveable structure 1008 may be comprised of at least one of a rigid plastic, metal, a composite material, aluminum, steel, or some other suitable type of material. Moveable structure 1008 may have a shape such as a beam, an "I" shape, a "U" shape, or some other suitable shape that may have a length. As depicted, the length may be about the height of first door 910.

In second configuration 1002, moveable structure 1008 may be moved in place to fill gap 1010. Additionally, moveable structure 1008 also may be configured to lock first door 910 and second door 912 when first door 910 and second door 912 are in a closed position and moveable structure 1008 has been moved to fill gap 1010.

Figure 11:
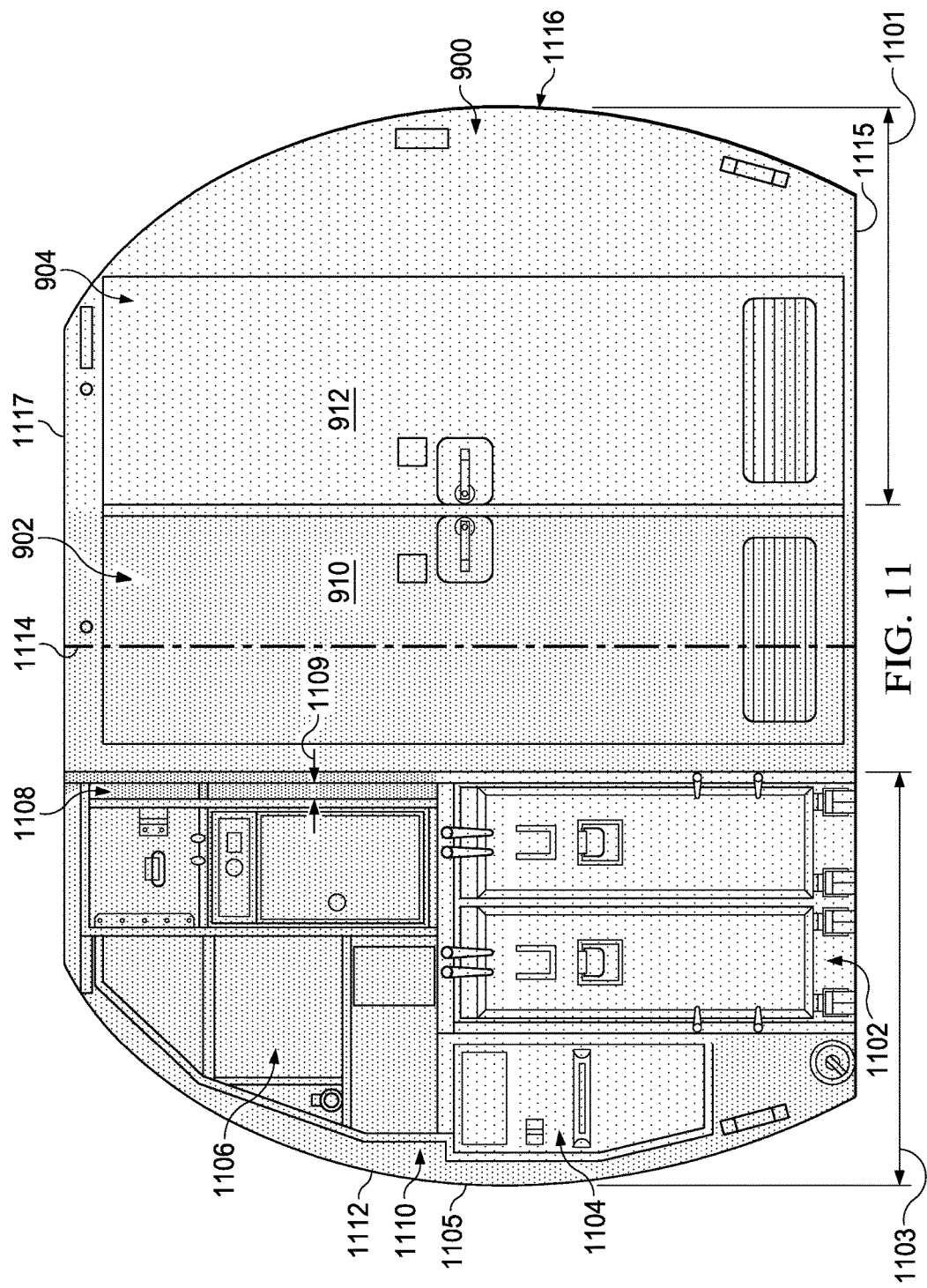
FIG. 11 is an illustration of a front view of a lavatory structure and a galley in accordance with an illustrative embodiment.

With reference now to FIG. 11, an illustration of a front view of a lavatory structure and a galley is depicted in accordance with an illustrative embodiment. Specifically, FIG. 11 is an illustration of first lavatory area 902 and second lavatory area 904 of FIG. 9 from direction 11-11 with an associated galley. Lavatory structure 900 and galley 1102 are examples of one physical implementation for lavatory structure 206 and galley 208 of FIG. 2. In particular, first lavatory area 902 and second lavatory area 904 are examples of physical implementations for first lavatory area 214 and second lavatory area 216 in FIG. 2.

As depicted, first lavatory area 902 includes first door 910 and second lavatory area 904 includes second door 912. Galley 1102 is located adjacent to lavatory structure 900. As can be seen in this illustrative example, first lavatory area 902, second lavatory area 904, and galley 1102 are located within fixed perimeter 1105. As galley 1102 and lavatory structure 900 are located within fixed perimeter 1105, changing the size of lavatory structure 900 necessarily changes the size of galley 1102.

In this illustrative example, first lavatory area 902 is a standard lavatory module. In this illustrative example, second lavatory area 904 is a specialty lavatory module. Width 1101 of second lavatory area 904 affects width 1103 of galley 1102. Specifically, as width 1101 of second lavatory area 904 increases, width 1103 of galley 1102 decreases. As can be seen in comparing FIGS. 8 and 11, width 1103 of galley 1102 is less than width 803 of galley 802. Further, width 1101 of second lavatory area 904 is greater than width 801 of second lavatory area 404.

In some illustrative examples, a sink of second lavatory area 904 may be positioned at height 1116. Height 1116 corresponds to a maximum diameter of fuselage 1112. Positioning a sink of second lavatory area 904 at height 1116 may affect width 1101. Specifically, positioning a sink of second lavatory area 904 at height 1116 may decrease width 1101.

Further, selection of a specialty lavatory area module affects width 1101 of second lavatory area 904. Each specialty lavatory area module has its own respective width. Some widths may be greater than or less than width 1101.

Galley 1102 has standard galley modules and specialty galley modules. Galley 1102 has cart and waste compartment module 1104, electrical and plumbing module 1106, stowage plug module 1108, and flange 1110. Cart and waste compartment module 1104 and stowage plug module 1108 are specialty galley modules. At least one of the size, layout, and components of cart and waste compartment module 1104 and stowage plug module 1108 may be affected by width 1103 of galley 1102. Accordingly, at least one of the size, layout, and components of cart and waste compartment module 1104 and stowage plug module 1108 may be affected by width 1101 of second lavatory area 904. Specifically, width 1109 of stowage plug module 1108 decreases as width 1101 of second lavatory area 904 increases. As illustrated, width 1109 of stowage plug module 1108 is sufficiently small so that stowage plug module 1108 only acts to fill the space between first lavatory area 902 and electrical and plumbing module 1106.

Electrical and plumbing module 1106 and flange 1110 of galley 1102 are standard galley modules. Electrical and plumbing module 1106 may be present in all aircraft of the same model. Further, flange 1110 may be present in all aircraft of the same model. Size and content of electrical and plumbing module 1106 and flange 1110 of galley 1102 are not based on width 1103 of galley 1102. Further, electrical and plumbing module 1106 and flange 1110 of galley 1102 do not change based on changing width 1103 of galley 1102. As can be seen from FIGS. 8 and 11, electrical and plumbing module 1106 is the same as electrical and plumbing module 806. Additionally, as can be seen from FIGS. 8 and 11, flange 1110 is the same as flange 810.

As depicted, fixed perimeter 1105 is formed by fuselage 1112. In this illustrative example, fuselage 1112 has center point 1114. Center point 1114 runs through floor 1115 and ceiling 1117 and divides fuselage 1112 into two approximately equal sections. As depicted, center point 1114 is positioned near the center of first lavatory area 902. The position of center point 1114 relative to first lavatory area 902 may change based on width 1101 of second lavatory area 904. As can be seen from FIGS. 8 and 11, the position of center point 1114 relative to first lavatory area 902 is different than the position of center point 814 relative to first lavatory area 402.

Figure 12:
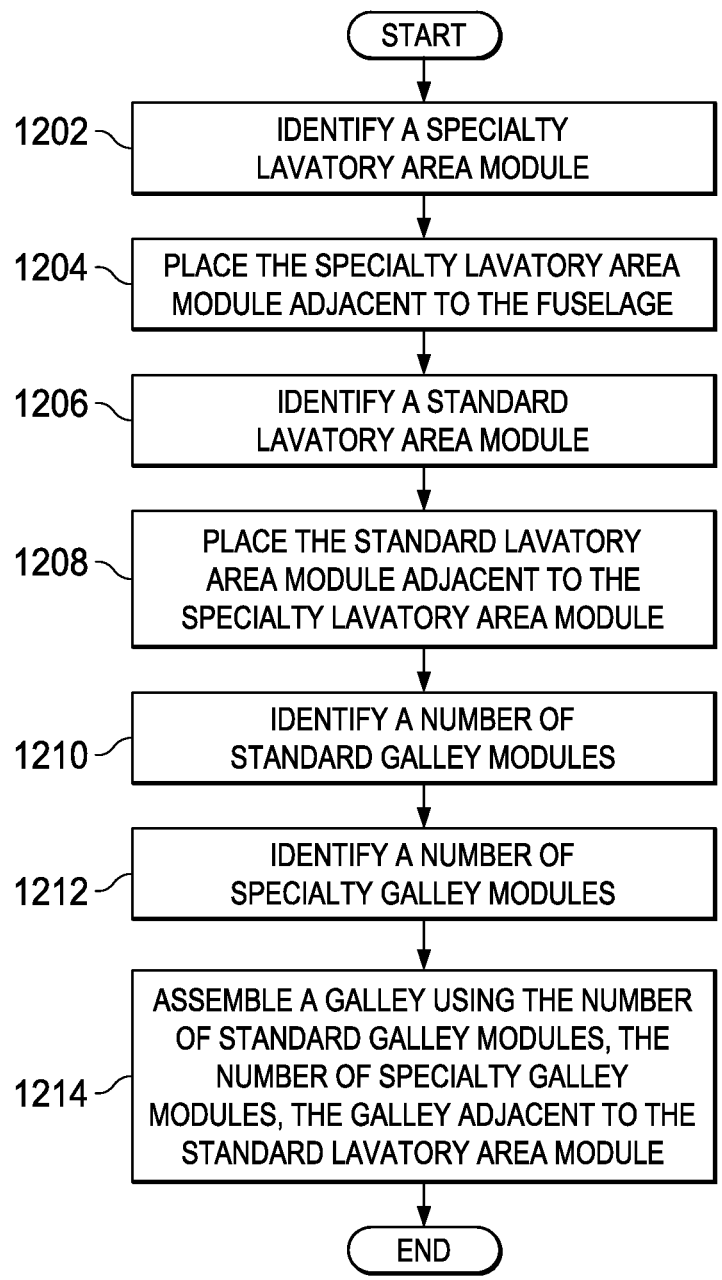
FIG. 12 is an illustration of a flowchart of a process for assembling a galley and a lavatory structure in accordance with an illustrative embodiment.

Turning now to FIG. 12, an illustration of a flowchart of a process for assembling a galley and a lavatory structure is depicted in accordance with an illustrative embodiment. The process illustrated in FIG. 12 may be implemented to assemble galley 208 and lavatory structure 206 in FIG. 2.

The process begins by identifying a specialty lavatory area module (operation 1202). As discussed above, specialty lavatory area modules may be lavatory area modules which are not necessarily used on all aircraft of the same model. Specifically, specialty lavatory area modules may offer different options for the lavatories on aircraft of the same model.

The process then places the specialty lavatory area module adjacent to the fuselage (operation 1204).

The process then identifies a standard lavatory area module (operation 1206). The standard lavatory area module may be standard lavatory area module 218 of FIG. 2. As discussed above, standard lavatory area modules may be lavatory area modules which are used on all aircraft of the same model.

The process then places the standard lavatory area module adjacent to the specialty lavatory area module (operation 1208). The standard lavatory area module has a first toilet. First toilet may be first toilet 224 of FIG. 2.

The process then identifies a number of standard galley modules (operation 1210). The identified number of standard galley modules may be number of standard galley modules 260 of FIG. 2. Specifically the identified number of standard galley modules may include flange module 264 and electrical and plumbing module 266 of FIG. 2. As discussed above, standard galley modules may be galley modules which are used on all aircraft of the same model.

The process then identifies a number of specialty galley modules (operation 1212). The identified number of specialty galley modules may be number of specialty galley modules 262 of FIG. 2. Specifically, the identified number of specialty galley modules may include cart and waste compartment module 268 and optional cart compartment extension module 270 of FIG. 2. As discussed above, specialty galley modules may be galley modules which are not necessarily used on all aircraft of the same model. Specifically, specialty galley modules may offer different options for the same type of module on aircraft of the same model.

The process then assembles a galley using the number of standard galley modules, the number of specialty galley modules, the galley adjacent to the standard lavatory area module (operation 1214). The galley, standard lavatory area module, and specialty lavatory area module are contained within a fixed perimeter. The fixed perimeter is defined by a fuselage of an aircraft. The process terminates thereafter.

Figure 13:
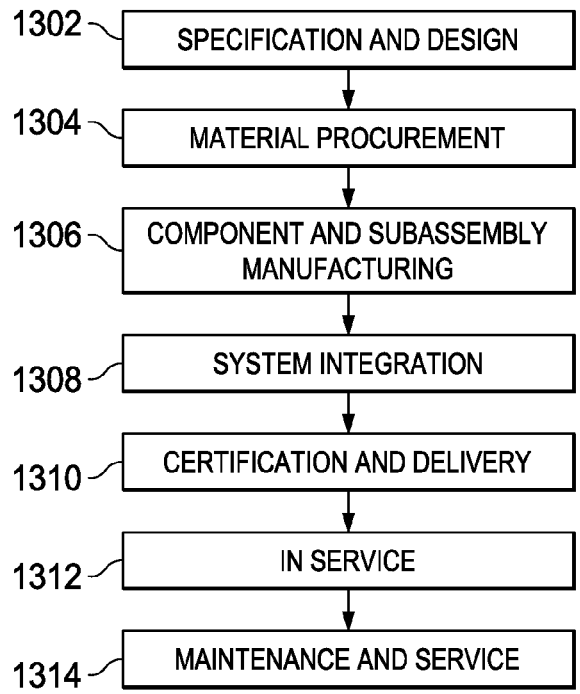
FIG. 13 is an illustration of a block diagram of an aircraft manufacturing and service method in accordance with an illustrative embodiment.
Figure 14:
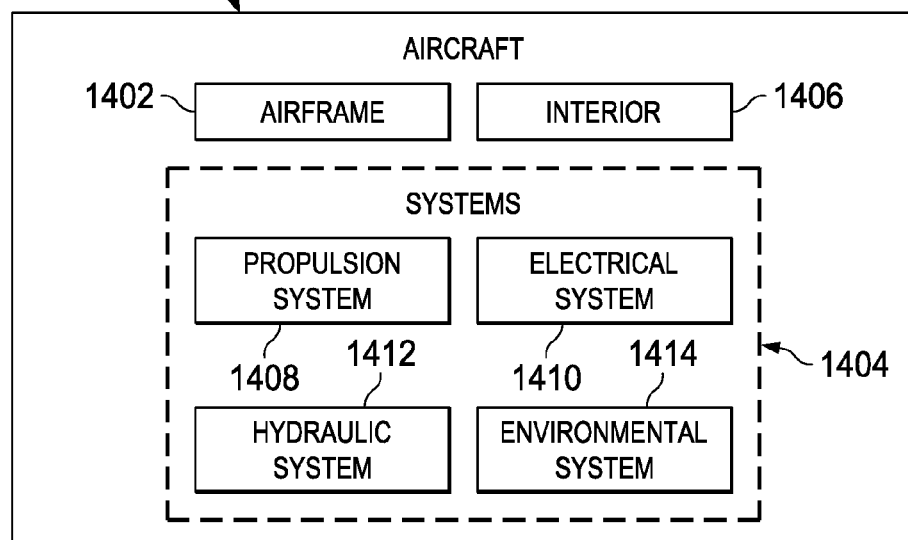
FIG. 14 is an illustration of a block diagram of an aircraft in which an illustrative embodiment may be implemented.

Illustrative embodiments of the disclosure may be described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 take place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. One or more illustrative embodiments may be used during component and subassembly manufacturing 1306. For example, galley 208 and lavatory structure 206 in FIG. 2 may be used during component and subassembly manufacturing 1306. Specifically, galley 208 and lavatory structure 206 in FIG. 2 may be assembled during component and subassembly manufacturing 1306. Further, galley 208 and lavatory structure 206 also may be used to perform replacements and upgrades during maintenance and service 1314. For example, aircraft 1400 may be inspected during scheduled maintenance for aircraft 1400.

The illustrative embodiments provide a method and apparatus for modular lavatory structures. Specifically, the illustrative embodiments provide a method and apparatus for forming a galley and a lavatory structure within a fixed perimeter formed by a fuselage.

Lavatory structure 206 may comprise first lavatory area 214 and second lavatory area 216. First lavatory area 214 may comprise standard lavatory area module 218. Second lavatory area 216 may comprise specialty lavatory area module 220. Galley 208 may comprise number of standard galley modules 260 and number of specialty galley modules 262. By forming lavatory structure 206 and galley 208 in a modular method, at least one of manufacturing time and manufacturing expenses may be reduced. Further, by forming lavatory structure 206 and galley 208 of modules, moving or creating new plumbing and electrical connections may be unnecessary. By forming lavatory structure 206 and galley 208 of modules, the plumbing and electrical connections may be the same for all aircraft of the same model.

In some illustrative examples, second lavatory area 216 may contain urinal 230. By having urinal 230 rather than second toilet 228, the width of second lavatory area 216 in front view may be reduced. In some illustrative examples, positioning urinal 230 along wall 236 may decrease the width of second lavatory area 216 from a front view. Wall 236 is associated with fuselage 211. In some illustrative examples, positioning urinal 230 along wall 236 and at a height corresponding to maximum diameter 238 of fuselage 211 may further decrease the width of second lavatory area 216 from a front view.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   identifying a specialty lavatory area module, wherein the specialty lavatory area module comprises a urinal;
   placing the specialty lavatory area module adjacent to a fuselage, wherein the urinal is positioned along a wall of the specialty lavatory area module, the wall adjacent to the fuselage;
   identifying a number of standard galley modules;
   identifying a number of specialty galley modules; and
   assembling a galley using the number of standard galley modules and the number of specialty galley modules, the galley adjacent to the fuselage;
   identifying a standard lavatory area module;
   placing the standard lavatory area module between the specialty lavatory area module and the galley within a fixed perimeter constrained in part by the fuselage.

2. The method of claim 1, wherein the number of standard galley modules comprises an electrical and plumbing module.

3. The method of claim 1, wherein the urinal is positioned at a height corresponding to a maximum diameter of the fuselage.

4. The method of claim 1, wherein the number of specialty galley modules comprises at least one specialty galley module selected from a cart and waste compartment module, a cart compartment extension module, and a stowage plug module.

5. The method of claim 1, wherein the number of standard galley modules comprises an electrical and plumbing module.

6. The method of claim 1, wherein the number of standard galley modules further comprises a structural flange module for positioning remaining modules of the galley.

7. The method of claim 1, wherein each of the number of standard galley modules further comprises standard electrical and plumbing connections configured for connection to standard electrical and plumbing connections in an aircraft.

8. A modular lavatory structure for an aircraft, the structure comprising:
   a galley comprising a number of standard galley modules;
   a first lavatory module, wherein the first lavatory area comprises a urinal, the urinal positioned along a wall of the first lavatory area, the wall adjacent to a fuselage of the aircraft; and
   a second lavatory module positioned between the first lavatory module and the galley, wherein the second lavatory module comprises a toilet;
   wherein the modular lavatory structure has a fixed perimeter constrained in part by a fuselage of the aircraft.

9. The modular lavatory structure of claim 8, wherein the number of standard galley modules comprises an electrical and plumbing module.

10. The modular lavatory structure of claim 9, wherein the galley further comprises a number of specialty galley modules.

11. The modular lavatory structure of claim 10, wherein the number of specialty galley modules comprises at least one specialty galley module selected from a cart and waste compartment module, a cart compartment extension module, and a stowage plug module.

12. The modular lavatory structure of claim 9, wherein each of the number of standard galley modules further comprises standard electrical and plumbing connections configured for connection to standard electrical and plumbing connections in an aircraft.

13. The modular lavatory structure of claim 9, wherein the number of standard galley modules further comprises a structural flange module for positioning remaining modules of the galley.

14. The modular lavatory structure of claim 8, wherein the urinal is positioned at a height corresponding to a waterline vertical position corresponding to a maximum diameter of the fuselage.

15. The modular lavatory structure of claim 8, wherein the first lavatory module comprises a specialty lavatory area module in the second lavatory module comprises a standard lavatory area module, the modular lavatory structure further comprising:
a first door for the specialty lavatory area module; and
a second door for the standard lavatory area module, wherein the first door and the second door are configured to move between an open position and a closed position and wherein a common passageway is present in both the specialty lavatory area module and the standard lavatory area module when the first door and the second door are in the open position.

16. The modular lavatory structure of claim 8 further comprising:
a moveable partition configured for use with the specialty lavatory area module and the standard lavatory area module, wherein the moveable partition is configured to separate the specialty lavatory area module and the standard lavatory area module into separate spaces when the moveable partition is in a first configuration, and wherein the moveable partition is configured to define a single space when the moveable partition is in a second configuration, wherein the first door and the second door are configured to open to form the single passageway for the single space when the moveable partition is in the second configuration.

17. The modular lavatory structure of claim 16, wherein the moveable partition is configured to fold in a manner that avoids contact with structures in the specialty lavatory area module and the standard lavatory area module.

18. The modular lavatory structure of claim 17 further comprising:
a moveable structure associated with the first door, wherein the moveable structure is configured to rotate relative to the second door and configured to block a gap between the first door and the second door when the first door and the second door are in the closed position.

19. The modular lavatory structure of claim 18, wherein the moveable structure is configured to lock the first door and the second door when the first door and the second door are in the closed position.

20. The modular lavatory structure of claim 17, wherein:
the first lavatory module further comprises a first sink; and
the second lavatory module further comprises a second sink.

21. The modular lavatory structure of claim 17, wherein first lavatory module is selected from a plurality of specialty lavatory area modules, each of the plurality of specialty lavatory area modules being different from each other based on at least one of size of the specialty lavatory area module, shape of the specialty lavatory area module, location of the urinal in the specialty lavatory area module, and location of the first second sink in the specialty lavatory area module.

* * * * *